United States Patent Office 2,801,721
Patented Aug. 6, 1957

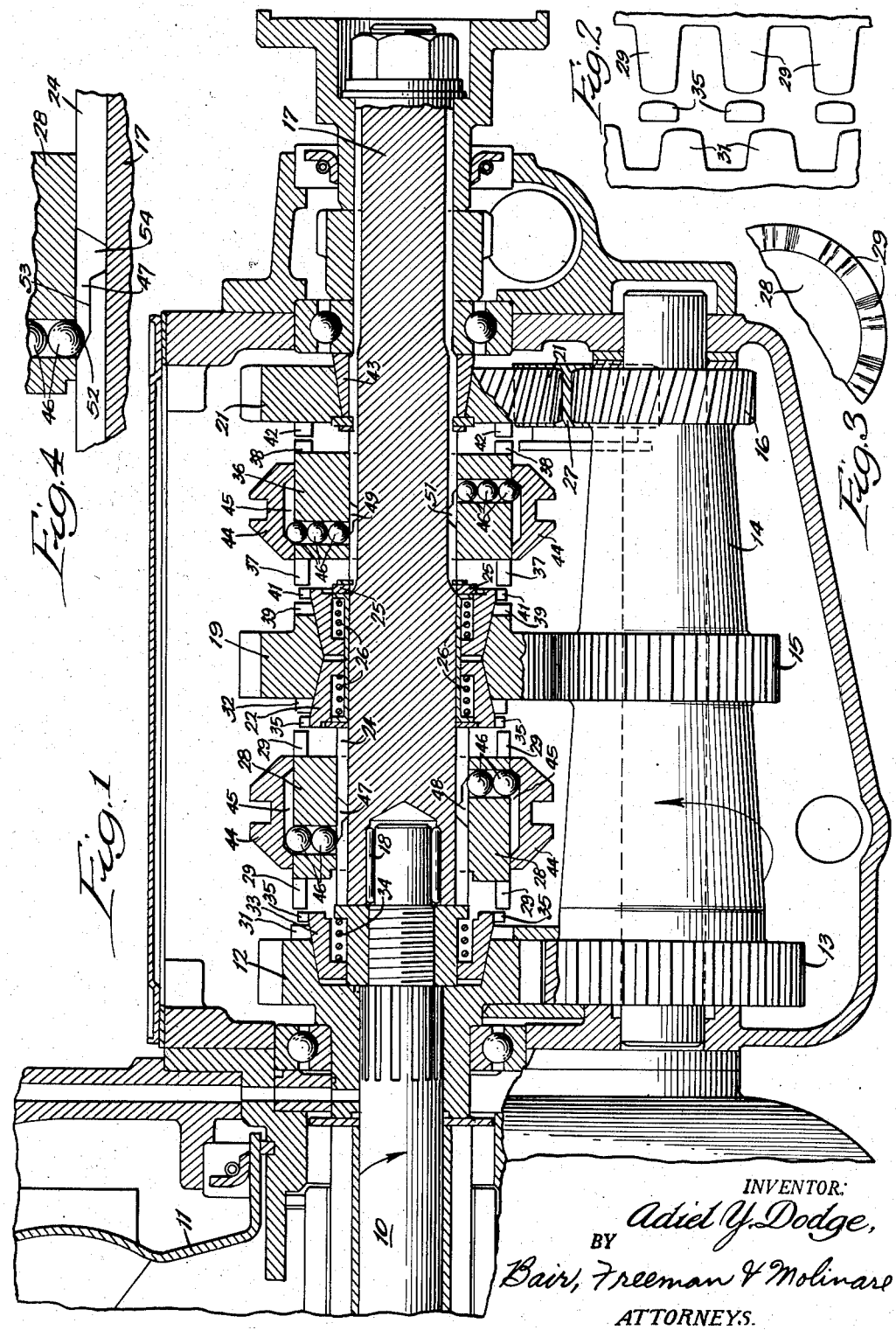

2,801,721
POWER TRANSMITTING MECHANISM

Adiel Y. Dodge, Rockford, Ill.

Application October 10, 1952, Serial No. 314,155

10 Claims. (Cl. 192—53)

This invention relates to power transmitting mechanisms and more particularly to a positive clutch construction for the transmission of torque.

Positive tooth clutches have been used in many types of power transmitting mechanisms to control the transmission of torque and to change driving ratios and conditions. It is highly desirable that such clutches be easy to engage and disengage even while under load and that they be held positively in engagement during driving.

In my copending application Serial No. 213,141, filed February 28, 1951, now Patent No. 2,735,528, there is disclosed and claimed a clutch which satisfies the requirements for easy disengagement under load and which is held positively in engagement during driving. This clutch can be engaged relatively easily when the difference in relative rotation of the parts is small but is difficult to engage when the speed and torque differences are substantial. Under such extreme conditions the clutch teeth may be damaged and are subjected to relatively rapid wear.

One of the objects of this invention is to provide a power transmission mechanism, including a positive clutch in which the teeth are protected against damage due to engagement at too large a difference in speed, and in which are provided means to help bring about synchronization and which can easily be disengaged under load and is held positively in engagement during torque transmission.

Another object is to provide a power transmitting mechanism in which the speed of the parts is substantially synchronized by friction means before engagement of the teeth and in which the teeth are shaped to load the friction means during initial engaging movement.

Still another object is to provide a power transmitting mechanism in which a synchronizer ring frictionally engages one of the parts and is provided with relatively thin teeth projecting radially between the teeth on the parts and which are engaged by one of the parts prior to engagement thereof with the other part.

According to one feature, engaging and disengaging movement of the parts is controlled by a cam mechanism having two stepped positions, one to urge the synchronizing ring teeth only into effective engagement and the other to hold the main clutch teeth on the parts in engagement.

A further object is to provide a power transmitting mechanism in which the clutch teeth are formed with helically generated surfaces providing at least a line contact in all relative positions thereof.

According to one feature of the invention, the clutch teeth are formed with rounded corners which are also helically generated so that line contact between the corner portions of the teeth is maintained during initial engagement and final disengagement.

The above and other objects and features of the invention will be more readily apparent when viewed in connection with the accompanying drawings in which:

Figure 1 is a central sectional view through a power transmitting mechanism embodying the invention;

Figure 2 is a developed view illustrating one form of clutch teeth embodying the invention;

Figure 3 is a partial end view of one of the clutch elements showing the tooth form; and Figure 4 is a partial enlarged section showing the actuating and locking mechanism.

As illustrated in Figure 1, the invention is embodied in a two speed and reverse transmission mechanism having an input shaft 10 which may be driven mechanically from an engine or the like or which may be driven hydraulically through a hydraulic torque converter, a portion of which is shown at 11. The input shaft 10 drives a pinion 12 meshing with a pinion 13 on a lay shaft 14 which also carries pinions 15 and 16. An output shaft 17 is arranged axially with the input shaft 10 and may have its inner end supported on a bearing 18 carried by a reduced extension of the input shaft.

Driven gears 19 and 21 are mounted on the output shaft 17 for free rotation relative thereto and may be connected to the output shaft by clutch mechanism as described hereinafter. The gear 19 meshes with the gear 15 and is mounted as shown on a pair of oppositely tapered synchronizer rings 22 and 23 which are freely rotatable on the output shaft 17 and have a limited axial movement thereon. As shown, the synchronizing ring 22 is held against movement to the left by splines 24 on the output shaft and movement of the synchronizing ring 23 to the right is limited by a snap ring 25. Springs 26 urge the synchronizer rings toward each other into frictional gripping engagement with tapered surfaces on the interior of the gear 19 with a relatively light degree of force.

The gear 21 constitutes a reverse gear and may mesh with a reverse idler 27 which in turn meshes with the gear 16. Preferably the gears 16, 21, and 27 are formed with helical teeth so that driving torque will produce an end thrust on the gear 21 for a purpose to appear more fully hereinafter.

Either the driving gear 12 or the gear 19 may be connected to the output shaft 17 by a double acting clutch mechanism including a shiftable sleeve 28 slidably splined on the splines 24. The sleeve 28 is formed at its opposite ends with elongated clutch teeth 29 to mesh with complementary clutch teeth 31 on the driving gear 12 and 32 on the gear 19. The teeth 31 and 32 may be of identical configuration and are preferably shorter axially than the teeth 29, as shown.

In order to synchronize the speeds of the clutch parts before engagement of the teeth thereof, a synchronizing ring 33 is fitted into a tapered cavity in the driving gear 12 and is urged inward thereof by a spring 34. The synchronizing ring 33 may be identical with the synchronizing ring 22 and each of them is formed with an annular series of teeth 35 projecting radially between the sets of clutch teeth 29 and 31 and 29 and 32. When the sleeve 28 is shifted toward one of the other of the gears to engage the desired clutch, the teeth 29 thereon will first engage the synchronizer teeth 35 and will exert axial pressure thereon to increase engagement between the synchronizer ring and the cooperating gear member. When the teeth 29 have engaged the synchronizer teeth 35 the synchronizer ring will turn with the sleeve 28 and through frictional engagement with its corresponding gear will tend to bring the gear and the sleeve 28 into synchronism. The main clutch teeth can therefore be engaged more readily without damage to the teeth.

The clutch teeth may be formed as best seen in Figures 2 and 3 to provide for safe engagement under non-synchronous conditions and for easy disengagement under load. As shown, the clutch teeth 29, 31, and 32 have their sides tapered axially toward each other so that when they are in engagement the torque load thereon will produce an axial thrust tending to disengage them. The tooth angle may be selected, preferably on the order of 11° to 14½°, to provide sufficient thrust to overcome tooth friction and friction in the splines so that the sleeve 28 can easily be shifted to disengage the clutch even when a substantial torque load is present. The synchronizer teeth 35 as shown are relatively thin axially and may also be tapered to fit between the teeth 29 so that the teeth 29 can project between them into mesh with the clutch teeth 31 and 32. Preferably all of the teeth have their corners at their outer tips rounded so that they can slide over each other easily while they are being brought into engagement and so that an axial thrust will be produced especially on the synchronizer rings.

According to another feature of the invention the engaging faces of all of the teeth are helically formed to provide at least a line contact in all relative positions thereof. In other words, the faces of the teeth including the rounded corners thereof are generated by lines perpendicular to the axis and passing through the tooth faces. With teeth shaped in this manner, line contact, if not surface contact, will be produced between engaging teeth under all conditions of engagement so that wear and possibility of damage to the teeth are minimized. Where the teeth have straight sides as shown surface contact therebetween will be present as soon as the teeth have passed corner engagement. It is contemplated, however, that under some conditions the teeth might have a curved shape similar to an involute gear tooth in which case only line contact would be present.

The gears 19 and 21 may similarly be connected to the shaft through a clutch mechanism including a sleeve 36 slidably splined on the output shaft 17 and having axially projecting clutch teeth 37 and 38 at its opposite ends. The clutch teeth 37 may be identical to the clutch teeth 29 to mesh with clutch teeth 39 on the gear 19. The synchronizing ring 23 carries short teeth 41 projecting between the clutch teeth 37 and 39 and corresponding to the teeth 35.

The teeth 38 may be shorter axially than the teeth 37 to mesh with complementary teeth 42 on the gear 21. The teeth 38 and 42 may be shaped similarly to the teeth 39 and 41 to provide an ejection angle and are also formed with rounded tips to facilitate engagement when they are out of synchronism. Pressure generated by these teeth urges the gear 21 axially of the output shaft 17 to engage an internal conical bore therein with a conically tapered friction surface 43 which is splined on the shaft 17 and is held against axial shifting thereon. Normally when the teeth 38 and 42 are out of engagement, the surface 43 can act as a tapered bearing surface upon which the gear 21 rotates freely. However, when the teeth are moving into engagement axially, pressure exerted thereby on the gear will shift it toward the large end of the surface 43 tending to engage the friction surfaces and connect the gear through the friction surfaces to the shaft. This friction connection tends to synchronize the speed of the gear with the shaft to facilitate shifting.

As noted above the gears 16, 21, and 27 are formed with helical teeth as shown so that during torque transmission an axial force will be exerted on the gear 21 due to the tooth angle. Assuming that the input shaft 10 is turning counter-clockwise as viewed from the left, the reverse pinion 27 will also be driven counter-clockwise and will drive the gear 21 clockwise. The angle of the teeth is such that torque load between the reverse pinion and the gear 21 will produce an axial thrust on the gear 21 urging it to the right to help engage the friction surfaces. Therefore, as soon as any torque is transmitted by the gear, the tooth reaction also tends to engage the friction surfaces to synchronize the gear speed. This action further assists in engaging and disengaging the clutch teeth 38 with the teeth 42. In an opposite manner when gear 21 is overrunning, the thrust caused by the helical angle of the gear teeth is in the direction which will reduce the thrust load on the taper bearing 43 thereby restoring the gear 21 to its free running condition.

The sleeves 28 and 36 are shifted in an identical manner by shift collars 44 which are slidable axially on the sleeves respectively. The shift collars 44 are formed with internal cam recesses 45 terminating at their ends in outwardly tapered cam surfaces to receive actuating and coupling elements shown as balls 46 which are slidable in radial bores in the sleeves. Each sleeve carries two axially spaced sets of balls as shown. The output shaft 17 on which the sleeves are slidably splined is formed with stepped cam recesses 47, 48, 49, and 51, to cooperate with the sets of balls 46 respectively.

Each of the cam recesses 47, 48, 49, and 51, is formed as shown in detail in Figure 4 in connection with the recess 47. Each recess starts with a gradual incline 52 sloping inward to a substantially straight surface 53 which terminates at a relatively deep pocket 54. The pocket 54 is formed by steeply sloping sides to provide a high mechanical advantage locking action.

In operation, assuming that the sleeve 28 is to be shifted to the right, the collar 44 thereon will be moved to the right. During initial movement the balls 46 at the left of the sleeve 28 will engage the left end of the recess 45 so that the sleeve will be shifted with the collar. After a relatively slight movement sufficient only to bring the rounded tips of the right hand teeth 29 into engagement with the tips of the teeth 35 on the synchronizer ring 22, the balls 46 will ride on the gradual incline 52 of the recess 47 and will exert a camming force on the sleeve tending to urge it into engagement with teeth 35 with a greater force than that exerted on the collar 44. After the speeds of the parts has become nearly synchronized, the collar 44 can be moved further to the right and the teeth 29 will engage the teeth 32 and the balls will drop into the deeper portions 54 of recess 47. At this time the left end of the collar which may be substantially cylindrical will engage the balls and will hold them firmly against accidental movement out of the recess even though the forces on the collar are extremely slight or if the internal collar surface is cylindrical without the exertion of any force at all. Thus, the clutch teeth are held positively in engagement despite the ejection angle thereon until the collar 44 is again shifted back to the left.

For movement of the sleeve 28 to the left the collar 44 may be shifted to the left. During the first part of this movement the left end of the collar will move off of the left hand set of balls so that they can move up into the recess 45 and the right end of recess 45 will engage the right hand set of balls to shift the sleeve to the left. On further movement of the collar to the left the same action as that described above will occur with the right hand set of balls 46 and the recess 48 to move the left hand teeth 29 initially into engagement with synchronizer teeth 35 and finally into mesh with the teeth 31. Similarly the sleeve 36 may be shifted to the left past the synchronizer ring teeth 41 and into mesh with the teeth 39 by shifting its collar 44 to the left. At this time the right hand set of balls 46 in the sleeve 36 will cooperate with the recess 51 to produce the holding action as described above. Upon shifting the sleeve 36 to the right through its collar 44 the left hand set of balls 46 in the sleeve will engage the gradual incline of the recess 49 when the tips of the clutch teeth 38 and 42 are in initial contact. Thus, loading may be maintained on these teeth with a relatively small force on the collar 44 and without transmission of any substantial shock back to the operating mechanism until substantial synchronism has been achieved. At this time the teeth 38 and 42 may be shifted fully into mesh and the sleeve 36 will be locked in its right hand position by engagement of the balls 46 with the deeper part 54 of the recess 49.

It will thus be seen that with the present invention shifting can be accomplished in either the engaging or disengaging operation relatively easily even though the parts to be connected are rotating relative to each other. Furthermore when the parts are engaged they are held firmly in engagement against any possibility of accidental displacement.

While the invention has been shown and described in connection with one particular type of mechanism it will be understood that this has been selected as illustrative only and is not to be taken as a definition of the scope of the invention, reference being had for this purpose to the appended claims.

What is claimed is:

1. In a power transmitting mechanism, a pair of coaxial relatively rotatable parts, an annular series of clutch teeth on one of the parts concentric therewith, a synchronizer ring frictionally engaging said one of the parts, an annular series of teeth on the synchronizer ring projecting radially into registry with the clutch teeth and relatively thin in an axial direction, an annular series of axially elongated clutch teeth on the other of the parts in registry with the first named clutch teeth and of an axial length to pass between the teeth on the synchronizer ring into engagement with the first named clutch teeth, the clutch teeth being tapered from their roots toward their tips to provide an ejection angle, a shift collar, means operatively connecting the shift collar to one of the parts to move it axially toward and away from the other part, and locking means operated by movement of the shift collar to hold said one of the parts in a position adjacent to the other part with the clutch teeth in engagement.

2. In a power transmitting mechanism, a pair of coaxial relatively rotatable parts, an annular series of clutch teeth on one of the parts concentric therewith, a synchronizer ring frictionally engaging said one of the parts, an annular series of teeth on the synchronizer ring projecting radially into registry with the clutch teeth and relatively thin in an axial direction, an annular series of axially elongated clutch teeth on the other of the parts in registry with the first named clutch teeth and of an axial length to pass between the teeth on the synchronizer ring into engagement with the first named clutch teeth, the clutch teeth being tapered from their roots toward their tips to provide an ejection angle, a shaft on which one of the parts is axially slidable and having a locking recess therein, said last named one of the parts having an opening extending radially therethrough, an actuating and locking member slidable in the opening, and a shift collar slidable axially on said last named one of the parts and having an internal cam recess therein to receive the actuating and locking member thereby to shift said part axially on the shaft and to cam the actuating and locking member into the recess in the shaft when it is in registry therewith to hold said part against axial movement on the shaft.

3. In a power transmitting mechanism, a pair of coaxial relatively rotatable parts, an annular series of clutch teeth on one of the parts concentric therewith, an annular series of clutch teeth on the other of the parts in registry with the first named clutch teeth, the clutch teeth being tapered toward each other to provide an ejection angle and having helically generated side surfaces to provide at least a line contact therebetween in all relative engaging positions thereof, a shaft connected to one of the parts to prevent relative rotation therebetween, means including a tapered friction surface supporting the other of the parts for rotation on the shaft and tapered in a direction such that axial pressure on said other part tends to engage the friction surface, a shift collar slidably mounted on the shaft, means operatively connecting the shift collar to said one of the parts to move it axially toward and away from the other part, and locking means operated by movement of the shift collar and engageable with the shaft to hold said one of the parts against sliding on the shaft in a position adjacent to the other part with the clutch teeth in engagement.

4. In a power transmitting mechanism, a pair of coaxial relatively rotatable parts, an annular series of clutch teeth on one of the parts concentric therewith, an annular series of clutch teeth on the other of the parts in registry with the first named clutch teeth, the clutch teeth being tapered toward each other to provide an ejection angle and having helically generated side surfaces to provide at least a line contact therebetween in all relative engaging positions thereof, a shaft on which one of the parts is slidably mounted for axial movement toward and away from the other part and to which said one of the parts is connected to prevent relative rotation therebetween, the shaft having a locking recess therein, said one of the parts having a radially extending opening therethrough to register with the recess when the parts are moved together with the clutch teeth in engagement, an actuating and locking member slidable in the opening, a shift collar slidable axially on said one of the parts and having an internal cam recess to receive the member thereby to shift the part through the member and to cam the member into the recess in the shaft when it is in registry therewith and a tapered friction surface rigid with the shaft and tapering toward said one of the parts, the other of the parts having a tapered opening therein complementary to and fitting on the tapered surface frictionally to engage it in response to axial pressure generated by the clutch teeth.

5. In a power transmitting mechanism, a pair of coaxial relatively rotatable parts, an annular series of clutch teeth on one of the parts concentric therewith, an annular series of clutch teeth on the other of the parts in registry with the first named clutch teeth, the clutch teeth being tapered toward each other to provide an ejection angle and having helically generated side surfaces to provide at least a line contact therebetween in all relative engaging positions thereof, a synchronizer ring between the parts having an annular series of teeth thereon projecting radially into registry with the teeth on the parts and relatively thin in an axial direction, complementary tapered friction surfaces on the ring and one of the parts to be engaged by pressure on the ring toward said one of the parts, a shaft on which the other part is axially slidable toward and away from said one part and having a locking recess therein, said other part having an opening therein to register with the recess when the parts are together with the teeth in engagement, an actuating and locking member slidable in the opening, and a shift collar slidable axially on said other part and having an internal cam recess to receive the member thereby to move the other part through the member and to cam the member into the recess in the shaft when it is in registry therewith.

6. The construction of claim 5 in which the recess in the shaft has two steps, one to receive the member when the teeth on said other part are meshed with the teeth on the synchronizer ring only and the other to receive the member when the teeth on the two parts are meshed.

7. In a power transmitting mechanism, a pair of coaxial relatively rotatable parts, complementary annular series of clutch teeth on the parts to mesh when the parts are shifted axially together, the clutch teeth being tapered toward each other to provide an ejection angle and having rounded tips, a shaft on which one of the parts is shiftable toward and away from the other having a two step recess therein with the first step terminating in an inclined cam surface, said one part having a radial opening therein, an actuating and locking member slidable in the opening, and a shift collar slidable axially on said one part and having an internal cam recess therein to receive the member to shift the part through the member and to urge the member radially inward, the recess and opening being so positioned that the member will engage the inclined cam surface when the rounded tips of the teeth are in engagement and will engage the second step of the recess when the teeth are in full engagement.

8. In a power transmitting mechanism, a pair of coaxial relatively rotatable parts, complementary annular series of clutch teeth on the parts to mesh when the parts are shifted axially together, the clutch teeth being tapered toward each other to provide an ejection angle and having rounded tips, a shaft on which one of the parts is shiftable toward and away from the other having a two step recess therein with the first step terminating in an inclined cam surface, said one part having a radial opening therein, an actuating and locking member slidable in the opening, a shift collar slidable axially on said one part and having an internal cam recess therein to receive the member to shift the part through the member and to urge the member radially inward, and a synchronizer ring between the parts frictionally engaging one of the parts and having teeth thereon projecting radially into registry with the teeth on the parts, the recess and opening being so positioned that the member will engage the cam surface when the teeth on said one part are in initial engagement with the teeth on the ring and will engage the second step of the recess when the teeth on the parts are engaged.

9. The mechanism of claim 3 in which said tapered friction surface is rigid with the shaft and tapers toward said one of the parts and said other of the parts has a tapered opening therein complementary to and fitting on the tapered surface frictionally to engage it in response to axial pressure generated by the clutch teeth.

10. The mechanism of claim 9 in which said other of the parts has spiral gear teeth thereon and including a gear having spiral teeth thereon meshing with the gear teeth on said other of the parts and angling in a direction to urge said other of the parts toward the larger end of the friction surface in response to torque load.

References Cited in the file of this patent

UNITED STATES PATENTS

| 1,746,764 | Carhart | Feb. 11, 1930 |
| 2,431,785 | Wildhaber | Dec. 2, 1947 |
| 2,684,741 | Gregory | July 27, 1954 |

FOREIGN PATENTS

| 855,807 | Germany | Nov. 17, 1952 |
| 899,311 | Germany | Dec. 10, 1953 |